United States Patent [19]

Avsan et al.

[11] Patent Number: 5,925,121
[45] Date of Patent: Jul. 20, 1999

[54] DATA PROCESSING SYSTEM AND METHOD FOR ACCESSING A COMMON DATA MEMORY

[75] Inventors: Oleg Avsan; Klaus Wildling, both of Huddinge, Sweden

[73] Assignee: Telefonaktiebolaget LM Ericsson, Stockholm, Sweden

[21] Appl. No.: 08/817,509

[22] PCT Filed: Oct. 17, 1995

[86] PCT No.: PCT/SE95/01208

§ 371 Date: Jul. 11, 1997

§ 102(e) Date: Jul. 11, 1997

[87] PCT Pub. No.: WO96/12234

PCT Pub. Date: Apr. 25, 1996

[30] Foreign Application Priority Data

Oct. 17, 1994 [SE] Sweden ................................. 9403532

[51] Int. Cl.⁶ .................................................. G06P 15/16
[52] U.S. Cl. .............................. 712/36; 712/34; 711/151
[58] Field of Search ........................... 395/800.01, 800.1, 395/800.23, 800.32, 200.3, 200.43, 200.38, 376, 676; 364/131–134; 712/1, 36, 10, 34, 23, 32, 200; 709/213, 208, 200, 7; 711/151

[56] References Cited

U.S. PATENT DOCUMENTS

| | | | |
|---|---|---|---|
| 3,969,701 | 7/1976 | Hemdal | 395/800.32 |
| 4,891,787 | 1/1990 | Gifford | 395/381 |
| 5,404,515 | 4/1995 | Chasse et al. | 395/676 |
| 5,517,656 | 5/1996 | Shi | 395/800.29 |
| 5,561,809 | 10/1996 | Elko et al. | 395/200.43 |
| 5,613,068 | 3/1997 | Gregg et al. | 395/200.46 |

FOREIGN PATENT DOCUMENTS 0 439 025 A2  7/1991  European Pat. Off. .

*Primary Examiner*—Larry D. Donaghue
*Attorney, Agent, or Firm*—Burns, Doane, Swecker & Mathis, L.L.P.

[57] ABSTRACT

The present invention relates to a system and a method for data processing and a communications system controlled by such a system. The system comprises at least one central processor, a number of different function blocks and a common data memory (DS), At least one function is table executed in parallel with program execution by an execution processor (IPU) wherein the data memory (DS) either is used for program execution or for table execution wherein one or the other type of the execution has precedence and is able to interrupt an on-going execution of the other type.

21 Claims, 1 Drawing Sheet

DATA PROCESSING SYSTEM AND METHOD FOR ACCESSING A COMMON DATA MEMORY

TECHNICAL FIELD

The present invention relates to a system and a method respectively for processing of data. The invention in particular relates to such a system for controlling for example real-time systems wherein the requirements on execution efficiency etc. are high since various high-capacity demanding functions have to meet real-time demands etc. In for example centrally controlled real-time systems of different kinds the system capacity for carrying out assigned functions is given by the execution efficiency of the central processor system.

The invention also relates to a communications system with such a system for data processing.

STATE OF THE ART

Numerous alternatives are known through which is intended to increase the efficiency in a system for a processing of data, for example used for real-time controlling or in general for systems wherein the requirements are high as to execution efficiency due to various capacity requiring functions. In order to achieve an increased efficiency it is among others known to provide such a system architecture that it enables a sharing of the total system load between different processors in the form of load and function sharing respectively. By so called pre-processing given regional control functions are carried out using regional processors and regional memories arranged in associated function blocks. A central processor then commands the execution of the functions and receives the results thereof.

The regional processors and the central processor each control their specified function handling. Thus a system is obtained which has a constant control load distribution. Such a system is in principle a one-processor system wherein the central processor controls function blocks comprising regional processors. In such a system the interprocessor-cooperation between the function blocks and the central processor must be well defined by the latter. Another known system for load sharing generally denoted multiprocessing comprises at least two central processors. These together access the data memories of the establishment and different computer configurations and control load distributions can be obtained for different operational periods. Through this processor redundancy a dynamical adaption to instantaneous traffic handling situations is enabled.

For both these kinds of systems interprocessor communication and processor cooperation is required which results in loads on the systems etc.

One known way of increasing the efficiency of a centrally controlled real-time system in which the system capacity is given by the execution efficiency of the central computer system is to execute in parallel executions through table controlled execution.

A highly demanding real-time system is for example a telecommunications system.

In U.S. Pat. No. 3,969,701 table execution is applied. Variables associated with a function block are translated with the use of tables from variable number to memory pointer values or address numbers in the memory operations in storing arrangements belonging to the respective block.

In U.S. Pat. No. 4,354,231 the use of tables is described. In this case cache-memories are used which actually can be seen as fast memories. In principle this only results in minor time savings and it is in no way possible to obtain the increase in efficiency which is desired in centrally controlled real-time systems.

SUMMARY OF THE INVENTION

One object of the present invention is to provide a system and a method respectively for processing of data wherein table control execution is used and through which a high efficiency can be achieved. Particularly it is an object of the invention to provide a system for controlling centrally controlled real-time systems in which a very high execution efficiency can be achieved.

One particular object of the present invention is to provide a system through which the system capacity of a function block oriented central processor system can be increased through the use of parallel executions of functions with the use of table execution.

It is a particular object to provide a system in which descriptive function tables can be used for increasing the efficiency of for example telephony traffic handling on a functional level in the data processing system.

Furthermore it is a particular object of the invention to provide a high total-processor capacity.

Furthermore, according to a particular object of the invention it is intended to provide a high traffic handling capacity in a simple and efficient way as compared to what is hither to known.

Particularly it is also an object of the present invention to provide a method through which the abovementioned objects are achieved. A further particular object of the invention is to provide a telecommunications system which is controlled by a system as referred to above.

These as well as further objects are achieved through a system for data processing and a method for data processing respectively in which at least one central processor is provided in which at least one function is table-executed parallelly with program execution by a least one execution processor. According to the invention is particularly a high total processor capacity achieved through parallel execution of functions in combination with one or more program executing processors. The combinations are given, according to a particular embodiment, taking load and function sharing aspects into account or in any other known way. Those data variables which are necessary for the intended function, for example teletraffic control in the case of a telecommunications network, can be executed in parallel in an efficient way through table controlled execution. According to particular embodiments of the invention such functions may for example be initiation of variables or data posts, statistic information, data collection, data output etc.

According to a particular embodiment the invention can be used for initiation of variable posts with a copying function which can be seen as a buffered job before the variable posts in an active way take part in the controlling of for example telephony switching. Particularly the initiation can take place in connection with a clearing of the connection. Variables which are to be initiated are in general allocated in the data processing system and can be spread throughout the address area of the data storage. Therefor the logical address of the data variables in the system are given. When accessing the memory particularly an address calculation is done to provide a physical address from a logical address with the use of a reference table, which is known per se. The logical addressing is a condition for the enablement of extending functions or providing changes in the data system during operation.

Particularly the variables can be of different format and they can be addressed as individuals with pointer and/or index values. Advantageously a number of variables can be associated with each data record.

According to an advantageous embodiment relating to data initiation setting with a copying function, first an executing table a so called masterpost is formed, one table per individual-variable record, which gives variables to be given an initial value in the common data memory and also the relevant values. For each variable is then one row provided in the table which comprises the logical address of the variable and a constant. Particularly a logical address can be indexed and/or refer to a sub-variable the length of which may vary between for example 1 and 128 bits. According to another advantageous embodiment the table may comprise a loop forming instruction for initiation data setting for example for indexed variables with the same logical address. The length of the table, i.e. the number of variables, can for example be given in the first table word. According to an alternative embodiment the number of variables or the table length can be given as the last data of the table. The execution tables can as referred to above be formed for example by the operation program of the data processing system at system re-starts or at start up. A program executing processor with a program instruction intended therefor activates masterposts for execution of the content of the tables.

With the use of this program instruction table execution in the program executing processor is carried out in parallel with a running traffic control program. According to an advantageous embodiment the table execution is terminated by a synchronization activity towards a processor for example by setting a so called state-bit to confirm that a job is terminated. According to an alternative embodiment program synchronization can be achieved through sending a signal to the program executing processor. The state-bit or the state-bits can then be searched using a searching instruction in the processor through which the processor is provided with information of which variable records which are resources that are available for the traffic controlling process.

The table executions are adapted to the system and it does not relate to any program control but every line of the table is particularly direct object controlling without the participation of any program administration instructions.

BRIEF DESCRIPTION OF THE DRAWINGS

The invention will in the following be further described in a non-limiting way under reference to the accompanying drawings in which.

DETAILED DESCRIPTION OF THE INVENTION

Figure 1:
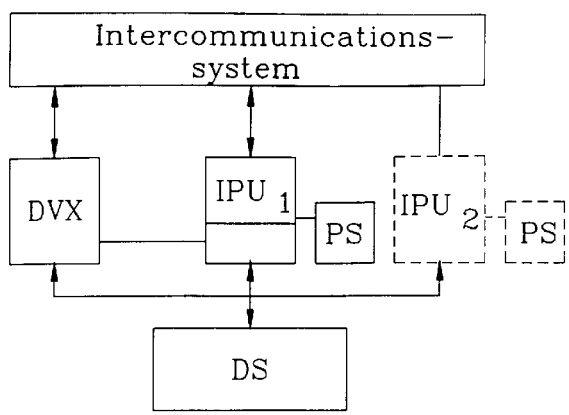
FIG. 1 illustrates a data processing system.

FIG. 1 illustrates one example of connection of a table executing unit DVX in a data processing system and internal communication between different units of the data processing system. In the schematical illustration of the data processing system, apart from the table executing unit DVX, two processor units or execution processors $IPU_1$ and $IPU_2$ are provided. These are connected to a centrally controlled buss and access handler ACC (Address Calculation Circuit). In the shown embodiment there are two execution processors $IPU_1$, $IPU_2$. This is of course only an example; according to another embodiment the system comprises only one executing processor and according to still further embodiments the system comprises more than two parallel execution processors or processor units. Each processor unit or execution processor comprises a program memory PS. Furthermore the system comprises a common data memory DS and the table executing unit DVX and the connection of the processing units $IPU_1$, $IPU_2$ to an inter-communication system which however will not be more thoroughly disclosed here since this in a manner which is known per se provides for communication with other systems etc.

The table executing unit DVX and the program execution processor(s) $IPU_1$, $IPU_2$ are connected between the inter-communication system and the system common memory DS for variables.

According to an advantageous embodiment the table executing unit DVX supports, when needed, efficient data transferring between the data processing system and various peripheral units in a way which is known per se using direct memory access (DMA-channel access) to the common data memory DS.

The common data memory DS can be organized in different ways. According to an advantageous embodiment the common data memory uses an organization of the memory which applies so called inter-leaving in a manner which is known per se and it operates in a multiplexing so called pipe-line structure towards free memory banks. These free memory banks in principle behave like fast memories. An address calculation circuit ACC controls the assignment of buss and memory accesses in the multiplexed data storage.

Figure 2:
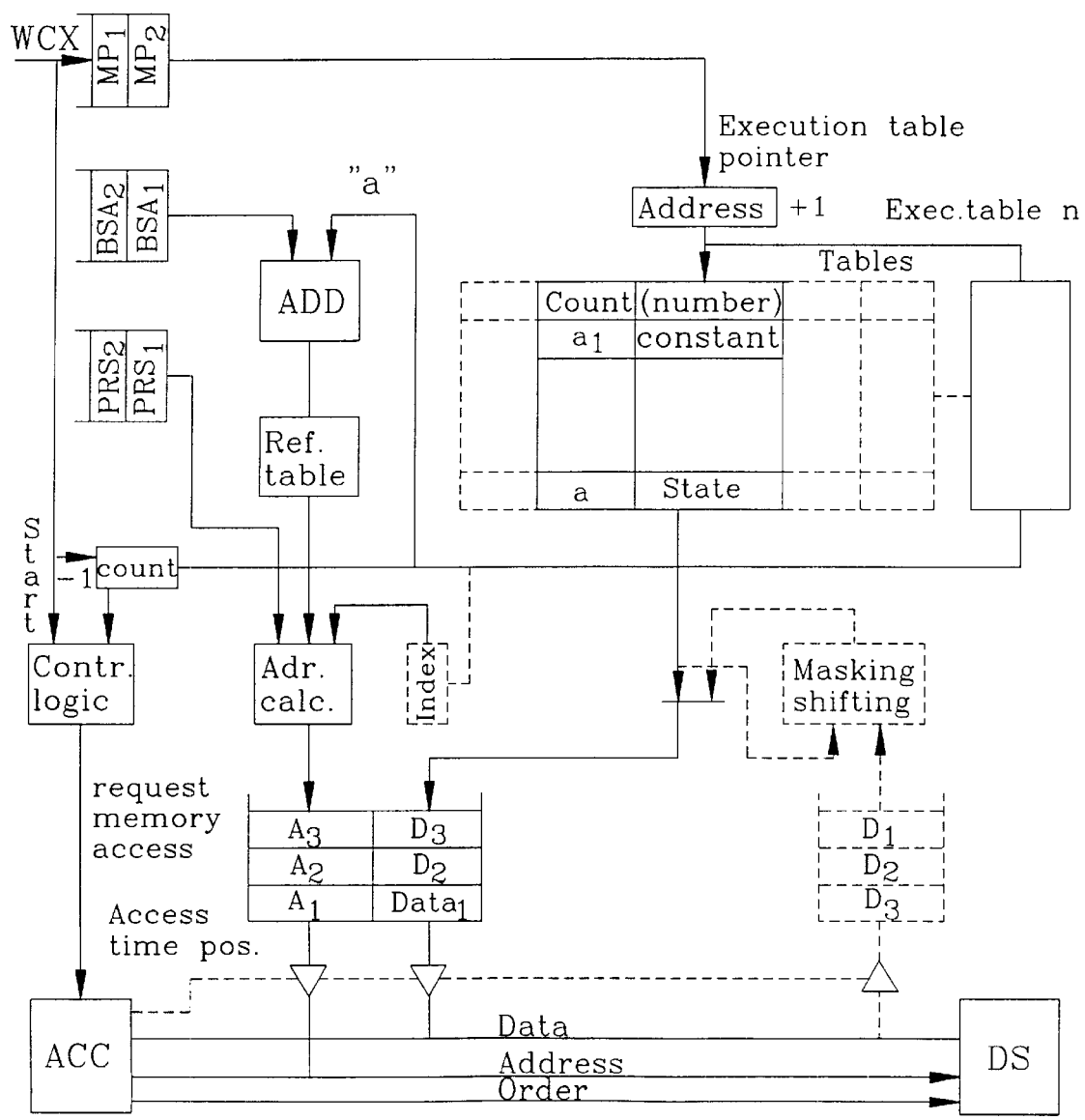
FIG. 2 illustrates an example of an internal structure 6 a table execution unit.

In FIG. 2 an example on an internal structure of a table executing unit DVX is illustrated. (One of its functions may e.g. relate to giving initial values to fullword variables in the data memory. Fullword variable means the directly controllable data format in the memory for write in without preceding read out of the memory word.)

Irrespective of the origin of an initiation, all memory accesses are in the shown embodiment done via the address calculation circuit which also controls the current order or sequential order. A calling unit and a called memory bank in most cases cooperate in an asynchronous way. Synchronizing is done by the address calculation circuit ACC, for example according to an advantageous embodiment in that it indicates when a memory address and write data respectively may occupy the buss for the memory access itself. For example a ready-bit (synchronization) can be used to indicate that read data is available whereas if the ready-bit is not shown, there is a waiting position.

The tables comprise a table setting for each initiation, control the jobs intended for the table executing unit which (the table executing unit DVX) independently executes these jobs. The variable accesses are requested via the address calculation circuit ACC and advantageously this comprises a priority order for handling the variable-accesses. The asynchronous coordination and an efficient pipe-line structure however require intermediate buffers for memory addresses and write data or in some cases read data. The table executing unit DVX comprises buffer memories for the register of the data processing system for logical addressing of variables, Base Start Address $BSA_1$, $BSA_2$ and $PRS_1$, $PRS_2$. BSA gives the address of a base table associated with a function block whereas PRS gives the individual number, i.e. the pointer to the variable record. These registers are set by the processor initiating the start of the table execution with an instruction WCX of the program intended therefor. There is also a register for WCX. WCX brings an execution table pointer $MP_1$, $MP_2$ (see FIG. 2) which is an address of the table to be executed. According to an advantageous embodiment the tables are so arranged that they form a fast memory. In the illustrated embodiment the first row of the table contains information about the number of variables or rows in the table which are affected by the copying whereas on the next row follows the first variable having a logical address "a" and the value of the constant to be set as an initial value, usually 0 or 1. On the following row the next variable is given etc. up to the last row of the table which is used for setting a so called state-bit with logical address "a". In the figure the n:th execution table is merely schematically indicated wherein n gives the number of execution tables of the system; there may be one or more. WCX starts the execution process and activates the control logic for addressing of the execution table which shall read the number of the variables and a so called loop-counter COUNT is loaded for the control logic. In the table is stepped by +1 to the next row and the first variable of the table. The logical address part (a) together with a Base Start Address, the BSA-content provides via an addressing circuit ADD an address to that reference table from which the physical data position of the memory is obtained (not shown). The memory address of the variable is given by calculation of WA, i.e. the physical data position in the memory and the pointer value in PRS (offset). In the present case an index value is also obtained. The address calculation itself is controlled via the above mentioned pipe-line stage and the constant part is transferred to the write data buffer. In the last pipeline stages of the address calculation a request for a memory access to the address calculation circuit ACC is activated according to the calculated variable address. Then, according to an advantageous embodiment, the initial constant is written in the common data memory DS. Table calculation is for example discussed in SE-B-439.208.

The WCX queue is according to an advantageous embodiment, handled sequentially and information about "full buffer" is given to the execution processor IPU or, if applicable, the concerned processor unit. Dashed lines in the - figure denote among others extensions when a variable is to be read and handled internally before re-writing in the common data memory DS. The pipe-line controlling as referred above may sometimes be stopped temporarily depending on the controlling participation of the address calculation circuit when memory accesses are executed. Normally, however, the table execution is terminated with the last row of the table when, according to advantageous embodiment, the state-bit is set in the data memory DS or through sending of a signal. According to an advantageous embodiment program execution by an execution processor IPU has preference over table execution through the table executing unit DVX. The parallel execution is then so applied that when the memory DS is free, i.e. not used by the execution processor for program execution, e.g. for traffic control or anything else, it is used for table execution. When the execution processor IPU again needs to use the data memory DS, it can interrupt a table execution in progress.

Of course the data processing system according to the invention can be used in other systems than telecommunications systems. Also in other aspects the invention is not limited to the shown embodiments but it can be varied in a number of ways within the scope of the claims.

We claim:

1. A system for processing data comprising:
a central processor system wherein a number of function blocks are assigned given functions, comprising at least one program execution processor and a data memory, wherein the system comprises at least one table execution unit which comprises at least one execution table and in that a number of variables are allocated in the data memory and in that program execution by at least one execution processor is done in parallel with table execution by the table execution unit wherein either program execution or table execution has prioritized access to the data memory and can interrupt an on-going execution of the other kind so that the data memory from a time aspect is used either for program execution or table execution.

2. The system according to claim 1, wherein program execution by the execution processors has a higher priority than table execution by the execution unit which uses the data memory when this is not used for program execution.

3. The system according to claim 2, wherein on-going table execution can be interrupted for program execution by the execution processor.

4. The system according to claim 1, wherein the function of giving variables or data records initial values with a copying function is executed in parallel with execution of traffic control programs by the program execution unit.

5. The system according to claim 4, wherein the collection of statistical information is a table executed function.

6. The system according to claim 1, wherein the functions data collection and/or data output is/are table executed.

7. The system according to claim 1, wherein variables are addressed as individuals e.g. with pointer values and/or index values.

8. The system according to claim 7, wherein one or more variables are associated with an individual record.

9. The system according to claim 4, wherein a table/individual variable record, an execution table, is formed which at least gives the variables to be given an initial value.

10. The system according to claim 9, wherein the execution table also provides the initial values which are to be given to the variables.

11. The system according to claim 10, wherein the initiation-value is given in the execution table.

12. The system according to claim 11, wherein each variable disposes one row in the execution table which at least contains the logical address of the variable and a constant.

13. The system according to claim 12, wherein the logical address indicates a variable of arbitrary length.

14. The system according to claim 9, wherein the execution tables are formed by an operating system of the data processing system.

15. The system according to claim 1, wherein program synchronization is provided by transmission of a signal to the concerned central processor or execution processor or by confirmation of a terminated job e.g. through a state-bit or similar for informing about which variable records that are resources which are free for the program execution or the traffic controlling process.

16. The system according to claim 1, wherein every row of the table is directly object controlling.

17. The system according to claims 1, wherein it is used for controlling a computer system.

18. The system according to claim 16, wherein it is used for controlling a centrally controlled telecommunications system.

19. The system according to claim 18, wherein the centrally controlled telecommunications system is the so called AXE-system.

20. A communications system comprising:
at least one system for data processing which at least comprises one execution processor and at least one data memory that is accessible by the execution processor, wherein:
the data processing system comprises at least one table execution unit that comprises an execution table and is capable of accessing the data memory;
a number of data variables are allocated in the data memory; and table execution of at least one variable is done in parallel with execution of traffic controlling programs by an execution processor, wherein the execution is done in such a way that an on-going table execution is interrupted by the execution processor for traffic controlling if the execution processor needs access to the data memory.

21. A method for processing data in a system including a number of function units, at least one execution processor and a data memory, the method comprising the steps such that:

execution is done by the execution processor in parallel with execution by a table execution unit that function tables are used for controlling those functions that are to be executed in parallel with execution by the execution processor wherein the table execution unit is connected to a data memory which is common for the system and wherein table execution is done when the data memory is not used by the execution processor for program execution.

* * * * *